United States Patent [19]

Utsunomiya et al.

[11] Patent Number: 5,369,875
[45] Date of Patent: Dec. 6, 1994

[54] METHOD OF MANUFACTURING STRAIN SENSORS

[75] Inventors: Michito Utsunomiya; Kazufumi Naito; Hiroyuki Konishi, all of Shiga, Japan

[73] Assignee: Ishida Co., Ltd., Kyoto, Japan

[21] Appl. No.: 165,938

[22] Filed: Dec. 14, 1993

[30] Foreign Application Priority Data

Dec. 15, 1992 [JP] Japan .................. 4-354556

[51] Int. Cl.⁵ .......................................... H01C 17/28
[52] U.S. Cl. ................................. 29/621.1; 29/412; 338/2
[58] Field of Search ............... 29/621.1, 620, 412; 338/2, 5, 6

[56] References Cited

U.S. PATENT DOCUMENTS

| | | | |
|---|---|---|---|
| 2,749,746 | 6/1956 | Wright | 338/5 |
| 3,075,160 | 1/1963 | Starr | 338/2 |
| 3,492,513 | 1/1970 | Hollander, Jr. et al. | 338/2 |
| 4,071,838 | 1/1978 | Block | 29/621.1 |
| 5,306,873 | 4/1994 | Suzuki et al. | 338/2 |

*Primary Examiner*—P. W. Echols
*Attorney, Agent, or Firm*—Sughrue, Mion, Zinn, Macpeak & Seas

[57] ABSTRACT

A method of manufacturing individual strain sensors (20) each comprised of a generally rectangular substrate (21) having first and second major surfaces opposite to each other, a strain detecting element (23) formed on the first major surface of the substrate and having at least one pair of strain sensing areas (23a), and a pair of grooves (24) defining respective areas (21a) of low rigidity and formed in the second major surface of the substrate (21) at respective locations adjacent the opposite ends of the substrate (21) while extending across the width of the substrate with the strain sensing areas (23a) of the strain detecting element (23) positioned in register with the respective grooves (24). The strain sensors (20) are prepared from a single plate material (30) of any suitable size having first and second surfaces opposite to each other and eventually forming respective substrates (21) of the individual strain sensors (20). A plurality of spaced groove segments (31) are formed on the second surface of the plate material (30) so as to extend parallel to each other, and a plurality of strain detecting elements (23) are subsequently formed on the first surface of the plate material (30) in a substantially matrix pattern so as to assume a predetermined positional relationship with respective positions of the groove segments (31). Thereafter, the plate material (30) is cut along cutting lines (b) extending in two different directions to separate the individual strain sensors (20).

7 Claims, 8 Drawing Sheets

METHOD OF MANUFACTURING STRAIN SENSORS

BACKGROUND OF THE INVENTION

1. Field of the Invention

The present invention relates to a strain sensor of a type generally useable in various load cells for detecting the weight of an object to be weighed or an accelerometer and, more specifically, to a method of manufacturing such strain sensor.

2. Description of the Prior Art

A load cell generally used in a weight detecting apparatus such as, for example, an electronic scale makes use of an elastic element of a generally hollow rectangular configuration comprising stationary and movable rigid bodies defined at opposite ends thereof and upper and lower beams extending between the rigid bodies while spaced a distance from each other, each of said upper and lower beams having a region of low rigidity. The stationary rigid body is fixedly secured to a support such as, for example, a housing framework of the apparatus and the movable rigid body is adapted to receive a load of which weight is desired to be measured. When in use the load is applied to the movable rigid body of the elastic element through, for example, a weighing table, the movable rigid body displaces relative to the stationary rigid body in a quantity proportional to the weight of the load, accompanied by the upper and lower beams yielding at the respective regions of low rigidity. By detecting a tensile strain or a compressive strain developed at the regions of low rigidity of the beams as a result of the relative displacement between the stationary and movable rigid bodies, an indication of the weight of the load applied can be obtained.

A sophisticated version of the load cell of a three-beam design is now conceived by the applicant. This prior art three-beam type load cell is shown in FIG. 11 of the accompanying drawings. Referring to FIG. 11 for the discussion of the prior art, the three-beam type load cell shown therein comprises an elastic element D of a generally parallelopiped configuration including rigid bodies A defined at opposite ends thereof, upper and lower beams B extending between the rigid bodies A in parallel relation to each other, each of said beams B having a pair of regions of low rigidity B1, and arms C extending from the respective rigid bodies A into a space, delimited by the rigid bodies A and the beams B, in alignment with each other in a direction close towards each other. A strain sensor E is fitted at its opposite ends to the respective arms C so that the elastic element D as a whole represents a three-layered structure. When in use a displacement of one of the rigid bodies A relative to the other of the rigid bodies A in a direction generally perpendicular to any one of the beams B results in a tensile strain or a compressive strain developed on the surface of a substrate of the strain sensor E, and a subsequent detection of the strain so developed on the strain sensor can provide an indication of the magnitude of the load applied, that is, the weight of an object having been weighed.

The strain sensor E employed is well known and is manufactured by the following manner which will now be described with reference to FIG. 12. Namely, a generally rectangular substrate F has its opposite ends adapted to be fixedly secured to the respective arms C of the elastic element D as shown in FIG. 11. This substrate F has two pairs of generally U-shaped notches F1 formed therein with each pair adjacent the corresponding end of the substrate E while the notches F1 of each pair extend inwardly of the substrate E from opposite side edges of the substrate E in alignment with each other so as to leave an associated neck region F2 having a low rigidity. A detecting element G having a pair of strain sensing areas G1 each comprised of a fine resistance wiring is deposited on an upper surface of the substrate E with the strain sensing areas G1 positioned respective surface portions of the substrate E where the associated neck regions F2 are defined.

It has however been found that, in the case of the strain sensor E of the structure described above, the amount of strain induced in each of the neck regions F2 of low rigidity as a result of application of a load, that is, the magnitude of an output from the detecting element G or the sensitivity to the strain depends on the ratio (L1/L2) of the width L1 of the substrate F relative to the width L2 of each of the neck regions F2 of low rigidity left by the respective pairs of the U-shaped notches F1. Accordingly, in order to increase the sensitivity to the strain, either must the width L1 of the substrate F be increased, or the width L2 of each of the neck regions F2 of low rigidity must be reduced. However, in view of the fact that the strain sensing areas G1 of the strain detecting element G are formed on the substrate F between the respective pairs of the U-shaped notches F1, that is, on the respective neck regions F2 of low rigidity, reduction in width L2 of each of the neck regions F2 of low rigidity is limited practically. Hence, a practical compromise to increase the sensitivity to the strain is to employ the substrate F having an increased width L1, and this in turn results in an increase in size of the strain sensor.

Also, the strain sensor E of the above described structure is prepared, as shown in FIG. 13, from a relatively large plate material H having one surface formed with a plurality of strain detecting elements G each having a pair of the strain sensing areas G1 and arranged in a matrix pattern, which strain detecting elements G are subsequently separated from each other by means of a laser beam cutting technique to provide the individual strain sensors E each being shown in FIG. 13. In such case, since two pairs of notches F1 must be formed for each resultant strain sensor E, a cutting line along which the plate material H has to be cut by means of the laser beam cutting technique to provide the individual strain sensors E is so complicated as shown by the phantom line in FIG. 13 and, therefore, the cutting involves a complicated and time-consuming procedure to such an extent as to result in a reduction in productivity of the strain sensors E.

There is an additional problem. A YAG laser is generally used during the cutting of the plate material H to provide the individual strain sensors E since the YAG laser is superior in that it brings about little thermal influence on the surroundings. However, during the formation of the notches F1, the laser beam is traversed in close proximity to the individual strain sensing areas G1 which are most sensitive and important areas and, therefore, there is no way to avoid a thermal influence on the strain sensing areas G1. Therefore, it often occurs that some of the resultant strain sensors E are found defective and/or are liable of a reduction in detecting accuracy.

SUMMARY OF THE INVENTION

In view of the foregoing, the present invention is intended to provide an improved strain sensor of either a three-beam type or a two-beam type which can be advantageously used in a load cell or an accelerometer and which can be manufactured in high productivity, capable of exhibiting a high detecting accuracy stably at all times.

To this end, the present invention provides a method of manufacturing individual strain sensors each comprised of a generally rectangular substrate having first and second major surfaces opposite to each other, a strain detecting element formed on the first major surface of the substrate and having at least one pair of strain sensing areas, and a pair of grooves defining respective areas of low rigidity and formed in the second major surface of the substrate at respective locations adjacent the opposite ends of the substrate while extending across the width of the substrate with the strain sensing areas of the strain detecting element positioned in register with the respective grooves.

According to the present invention, these strain sensors are prepared from a single plate material of any suitable size having first and second surfaces opposite to each other and eventually forming respective substrates of the individual strain sensors. A plurality of groove segments spaced a predetermined distance from each other are then formed on the second surface of the plate material so as to extend parallel to each other, and a plurality of strain detecting elements are subsequently on the first surface of the plate material in a substantially matrix pattern so as to assume a predetermined positional relationship with respective positions of the groove segments. Thereafter, the plate material is cut along cutting lines extending in two different directions to separate the individual strain sensors.

In the practice of the method of the present invention, if after the formation of the parallel groove segments on the second surface of the plate material, which groove segments eventually form the areas of low rigidity in the substrate of each strain sensor, the strain detecting elements are formed on the first surface of the plate material in any known manner so as to assume the predetermined positional relationship with the respective positions of the groove segments, the subsequent cutting of the plate material along the cutting lines extending in the two different directions, i.e., widthwise and lengthwise of the plate material, results in separation of the individual strain sensors. Therefore, as compared with the prior art method of cutting to provide strain sensors each having notches, the cutting job is extremely easy to perform and the productivity of the strain sensors is increased accordingly.

In each strain sensor manufactured according to the method of the present invention, the pair of the regions of low rigidity in the rectangular substrate positioned adjacent the respective opposite ends of the rectangular substrate are defined by the grooves formed on the second major surface of the substrate opposite to the first major surface where the strain detecting element is formed. Accordingly, the sensitivity of the strain sensor to the strain is determined by the wall thickness of that portion of the substrate where each area of low rigidity is defined, and therefore, by properly choosing the wall thickness of that portion of the substrate, a required sensitivity to the strain can be obtained. This means that a compact strain sensor capable of exhibiting an accurate sensing performance can be manufactured with no need to employ the substrate of an increased width such as required in the prior art strain sensor. The use of the compact strain sensor provided for by the method of the present invention contributes to a reduction in size of the load cell or accelerometer utilizing the strain sensor. Also, where the strain sensors are prepared from a single plate material, the number of the strain sensors which can be prepared from the single plate material can be increased, accompanied by an increase of the productivity and a reduction in cost.

Where the cutting lines along which the plate material is to be cut to provide the individual strain sensors extend perpendicular to each other and in the respective direction widthwise and lengthwise of the plate material, the cutting process can easily be performed.

Preferably, the distance defined between each cutting line extending in one of the two directions and each of the strain sensing areas of each of the strain detecting elements and the distance defined between each cutting line extending in the other of the two directions and each of the strain sensing areas of such strain detecting element are so chosen as to provide a respective marginal area sufficient to prevent the strain detecting element from being adversely affected during an execution of the cutting step along the cutting lines. This is particularly advantageous in that the strain sensing areas can be isolated from any possible adverse effect which would otherwise be brought about when the laser beam traverses in close proximity of the strain sensing areas during an execution of the cutting process. The result is that the highly accurate strain sensor can be obtained.

Also preferably, terminal elements for electrically connecting the strain detecting element with an external signal processing device are formed on the first surface of the plate material at a location between the strain sensing areas of each of the strain detecting elements and adjacent the cutting line corresponding to one side edge of the substrate of each eventually formed strain sensor. By so doing, a maximized utilization of a space is possible for connecting lines leading from the external signal processing device with the strain detecting element.

Although the plate elements having the plural strain detecting elements may be cut by machining to provide the individual strain sensors, the use of a laser beam is particularly preferred since the plate material can be cut to a high precision while providing a smooth cut face.

The grooves can be formed easily by means of an etching process.

Where the plate material is made of metal such as, for example, stainless steel or aluminum, an electrically insulating layer is to be formed on the first surface of the plate material prior to the formation of the strain detecting elements so that no electric contact occurs between the strain detecting elements and the plate material.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1A:
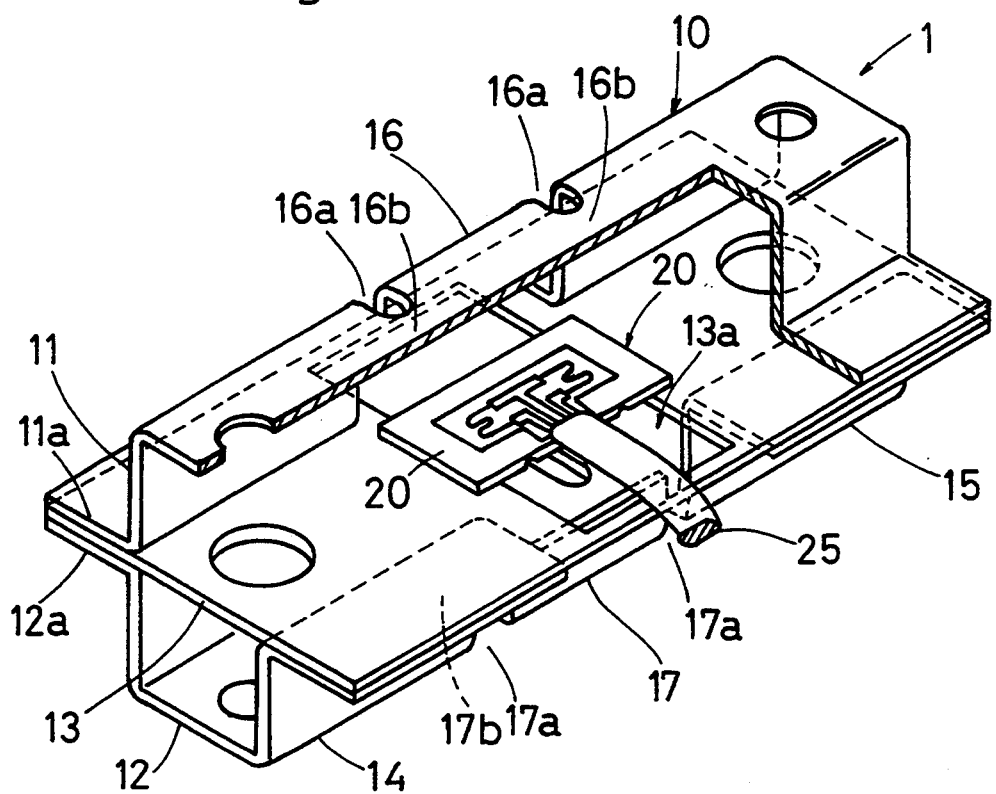
FIG. 1a is a perspective view, with a portion cut away, showing an example of a load cell in which a strain sensor manufactured according to a method of the present invention can be employed.

With reference to FIG. 1a, the load cell in which a strain sensor according to the present invention may be employed will first be described in detail. The illustrated load cell, generally identified by 1, comprises an elastic element 10 of a hollow box-like configuration. This elastic element 10 is of a substantially three-layered structure which includes upper and lower plate members 11 and 12 of a generally U-shaped cross-section, each prepared from a metallic plate and having a pair of side flanges 11a or 12a integrally formed therewith, and a generally rectangular intermediate plate member 13 having its opposite side portions fixedly sandwiched between the side flanges 11a of the upper plate member 11 and the side flanges 12a of the lower plate member 12.

One end of the elastic element 1, that is, a portion of the elastic element 1 defined by respective one ends of the upper plate member 11, the lower plate member 12 and the intermediate plate member 13, forms a stationary rigid body 14 while the opposite end of the elastic element 1, that is, an opposite portion of the elastic element 1 defined by respective other ends of the upper plate member 11, the lower plate member 12 and the intermediate plate member 13, forms a movable rigid body 15.

In this construction, respective portions of the upper plate member 11 and the lower plate member 12 intermediate between the opposite ends, that is, the stationary and movable rigid bodies 14 and 15 of the elastic element 1 form respective beams 16 and 17. Each of the beams 16 and 17 has a pair of notches 16a or 17a positioned adjacent the stationary and movable rigid bodies 14 and 15, said notches 16a or 17a of each pair extending in alignment with each other in a direction widthwise of the associated plate member 11 or 12 so as to leave a respective neck region 16b or 17b of low rigidity. On the other hand, the intermediate plate member 13 has an opening 13a defined therein at a location intermediate of the length thereof, and a generally rectangular strain sensor 20 is mounted in said opening 13a with its opposite ends fixedly secured to opposite portions of the intermediate plate member 13 around the opening 13a and with its longitudinal axis aligned with the longitudinal axis of the intermediate plate member 13.

Figure 1B:
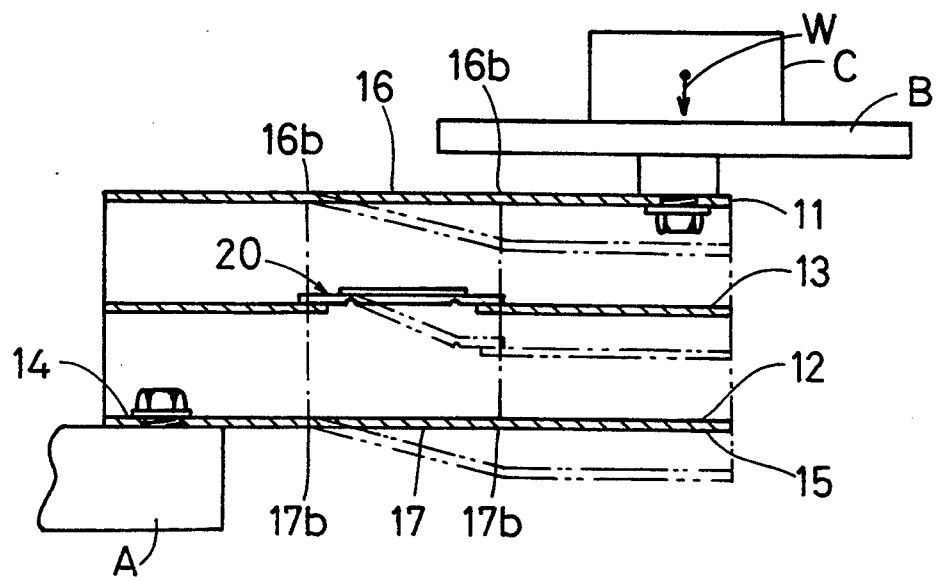
FIG. 1b is schematic side view showing the manner in which the load cell operates.

As shown in FIG. 1b, when in use, the stationary rigid body 14 is fixedly secured to a bench A, for example, a housing framework of a weighing apparatus, while the movable rigid body 15 is coupled with a weighing table B. Placement of a load W of an object C to be weighed on the weighing table B results in a flexure of the upper and lower beams 16 and 17 about the respective neck regions 16b and 17b of low rigidity in a direction generally perpendicular to the lengthwise direction of each beam 16 and 17 as shown by the phantom line in FIG. 1b with the movable rigid body 15 displaced downwardly, as viewed in FIG. 1b, relative to the stationary rigid body 14, accompanied by a corresponding flexure of the strain sensor 20 carried by the intermediate plate member 13. As the strain sensor 20 is so deformed, one end of the strain sensor 20 adjacent the movable rigid body 15 is correspondingly displaced downwardly relative to the opposite end of the strain sensor 20 adjacent the stationary rigid body 14 with tensile and compressive strains consequently induced on a surface of a substrate forming a part of the strain sensor 20. By detecting the tensile and compressive strains induced in the strain sensor 20, the load applied to the movable rigid body 15 can be measured.

The structure of the strain sensor 20 will now be described in detail with particular reference to FIG. 2. As shown therein, the strain sensor 20 comprises a generally rectangular substrate 21 made of metal such as, for example, stainless steel, and a strain detecting element 23 formed on one of first and second opposite major surfaces, for example, the first major surface, of the substrate 21 through an insulating layer 22 made of electrically insulating material such as, for example, polyester or polyimide. The second major surface of the substrate 21 is formed with grooves 14 positioned adjacent the opposite ends of the substrate 21 and extending across the width thereof so as to leave respective reduced thickness areas which define associated areas 21a of low rigidity of the substrate 21.

The strain detecting element 23 referred to above includes a pair of strain sensing areas 23a each in the form of a resistance wiring and positioned substantially in register with the associated groove 24 in the substrate 21, a generally L-shaped first conductor 23b electrically connecting one end of one of the strain sensing areas 23a with a first terminal element 23c, a generally L- shaped second conductor 23b electrically connecting one end of the other of the strain sensing areas 23a with a second terminal element 23c, and a generally T-shaped third conductor 23b electrically connecting the other ends of the respective strain sensing areas 23a with a third terminal element 23c. This strain detecting element 23 is so designed and so configured as to provide a so-called half-bridge circuit, said terminal elements 23c being positioned adjacent one side portion of the substrate 21. It is to be noted that the distance L3 between each end 21b of the substrate 21 and the adjacent strain sensing area 23a of the strain detecting element 23 and the distance L4 between each side edge 21c of the substrate 21 and the adjacent strain sensing area 23a of the strain detecting element 23 are so sized as to provide a marginal area sufficient to prevent each strain sensing areas 23a from being adversely affected by heat evolved during the cutting process as will be described later.

Figure 2:
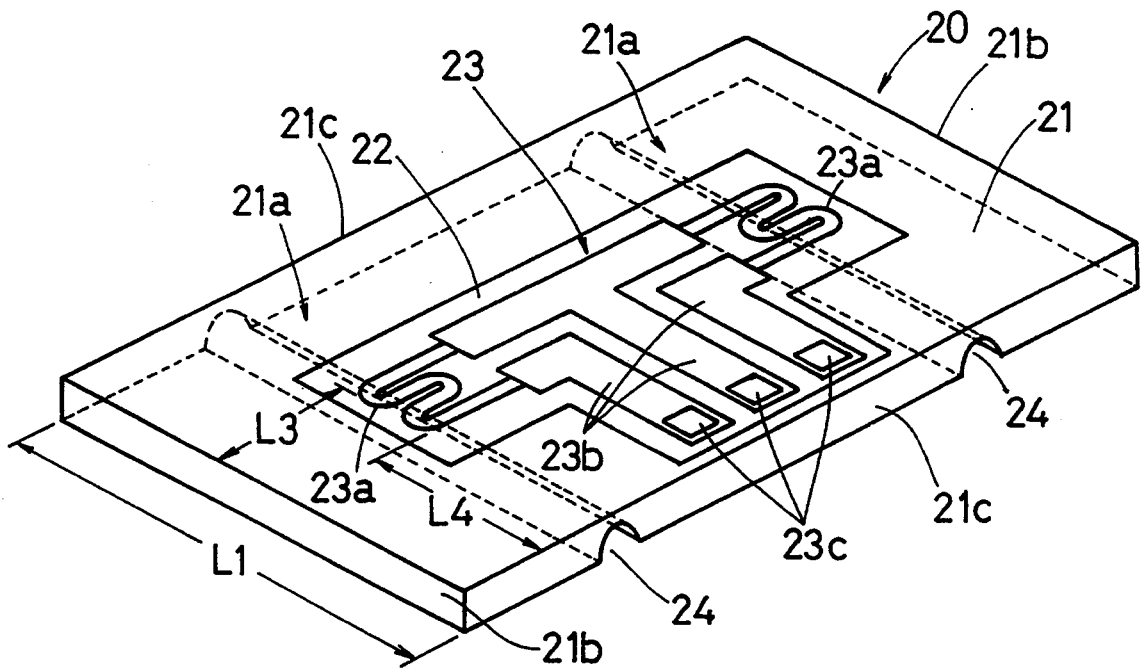
FIG. 2 is a perspective view of the strain sensor.

When as a result of deformation of the elastic element 10 shown in FIG. 1a the tensile strain and the compressive strain are induced in a surface region of one of the areas 21a of low rigidity of the substrate 21 shown in FIG. 2 and a surface region of the other of the areas 21a of low rigidity of the substrate 21, respectively, the resistance values of the respective strain sensing areas 23a correspondingly vary, i.e., increases or decreases. A change in resistance value of each strain sensing area 23a is outputted to an external signal processing device (not shown) through a cable 25 shown in FIG. 1a having respective lines electrically connected with the first to third terminal elements 23c as shown in FIG. 2, which signal processing device performs a calculation to determine the magnitude of the load which has resulted in the deformation of the elastic element 10 and, hence, that of the substrate 21 of the strain sensor 20.

As hereinabove described, disposition of the first to third terminal elements 23c adjacent the side edge 21c of the substrate 21 makes it possible to connect the first to third terminal elements 23c with the external signal processing device through the cable 25 without permitting the cable 25 to interfere with any one of the strain sensing areas 23a while providing a sufficient space for the electric connection.

In the strain sensor 20 of the above described construction, the sensitivity of the strain sensor 20 to the induced strain depends on the depth of each of the grooves 24 which define the areas 21a of low rigidity in the substrate 21, that is, the wall thickness of that portion of the substrate 21 where each area 21a of low rigidity is defined, and therefore, by properly choosing the wall thickness of that portion of the substrate 21, a required sensitivity to the strain can be obtained. Accordingly, it is possible to reduce the width L1 of the substrate 21 to such a value as required in forming the strain detecting element 23 and, therefore, the strain sensor 20 and, hence, the load cell as a whole can be manufactured compact in size.

Hereinafter, a method of making the strain sensor 20 of the above described construction will be described.

Figure 3:
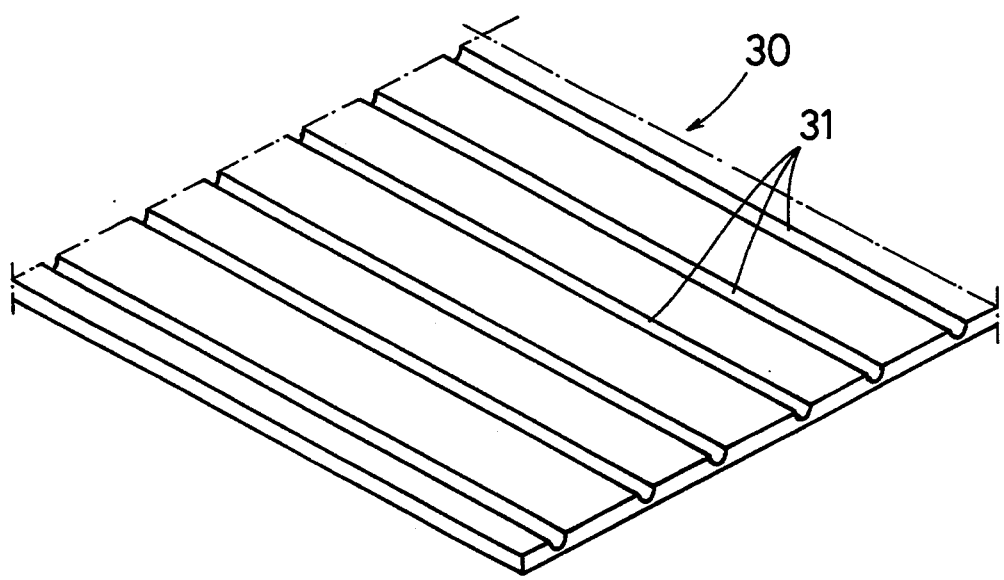
FIG. 3 is a perspective view showing a plate material which eventually forms substrates for the strain sensors and in which grooves are formed during the practice of the method according to one preferred embodiment of the present invention.

Given a rectangular plate material 30 of a suitable size made of metal such as, for example, stainless steel, a plurality of parallel grooves 31 are formed on one surface (a second surface) of the plate material 30 with a predetermined space between the neighboring grooves as shown in FIG. 3. To form these parallel grooves 31 in the plate material 30, any known machining process may be employed. However, in the illustrated embodiment of the present invention, a half-etching technique which is one of the known etching methods is employed and practiced in the following manner.

Figure 4:
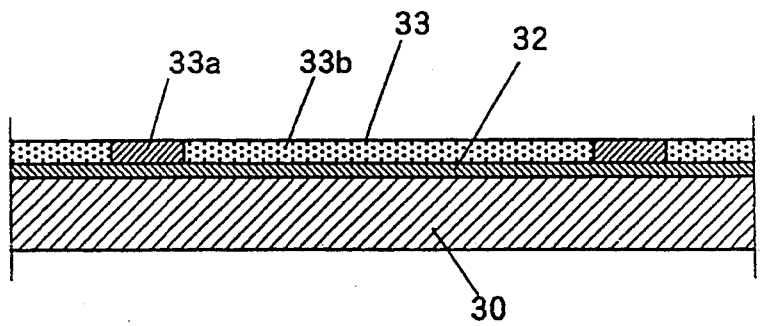
FIG. 4 is a side sectional view, on an enlarged scale, showing a first step of an etching method for forming the grooves in the plate material.
Figure 5:
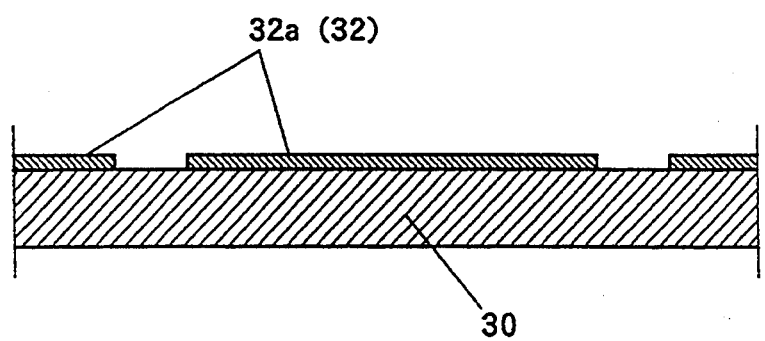
FIG. 5 is a side sectional view, on an enlarged scale, showing a second step of the etching method for forming the grooves.

At the outset, as shown in FIG. 4, a resist film 32 is formed on the surface of the plate material 30, followed by a placement of a patterned masking film 33 over the resist film 32. The patterned masking film 33 has a pattern of light shielding areas 33a and light transmissive areas 33b alternating with the light shielding areas 33a, said light shielding areas 33a corresponding in position to the grooves 31 which are eventually formed in the plate material 30. The plate material 30 having the resist film 32 covered by the patterned masking film 33 is subsequently exposed to light from above so that respective portions of the resist film 32 in register with the light transmissive areas 33b of the patterned masking film 33 can be cured.

The patterned masking film 33 is then removed off, or otherwise removed in any suitable manner, from the plate material 30 and the non-cured areas of the resist film 32 which have been registered with the light shielding areas 33a of the patterned masking film 33 are removed in contact with a developing solution of a predetermined composition, thereby leaving only the cured portions 32a of the resist film 32 on the surface of the plate material 30.

Figure 6:
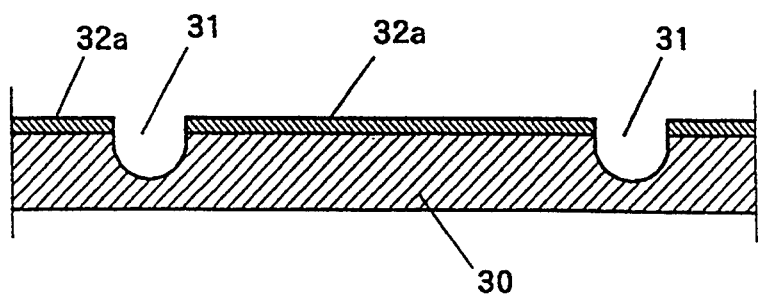
FIG. 6 is a side sectional view, on an enlarged scale, showing a third step of the etching method for forming the grooves.

Thereafter, as shown in FIG. 6, using any known etching process, portions of the plate material 30 where the resist layer 32 no longer exist are etched off to a desired depth to thereby form the grooves 31 in that surface of the plate material 30, followed by removal of the cured portions 32a of the resist layer 32 to complete the grooved plate material 30 such as shown in FIG. 3.

Figure 7:
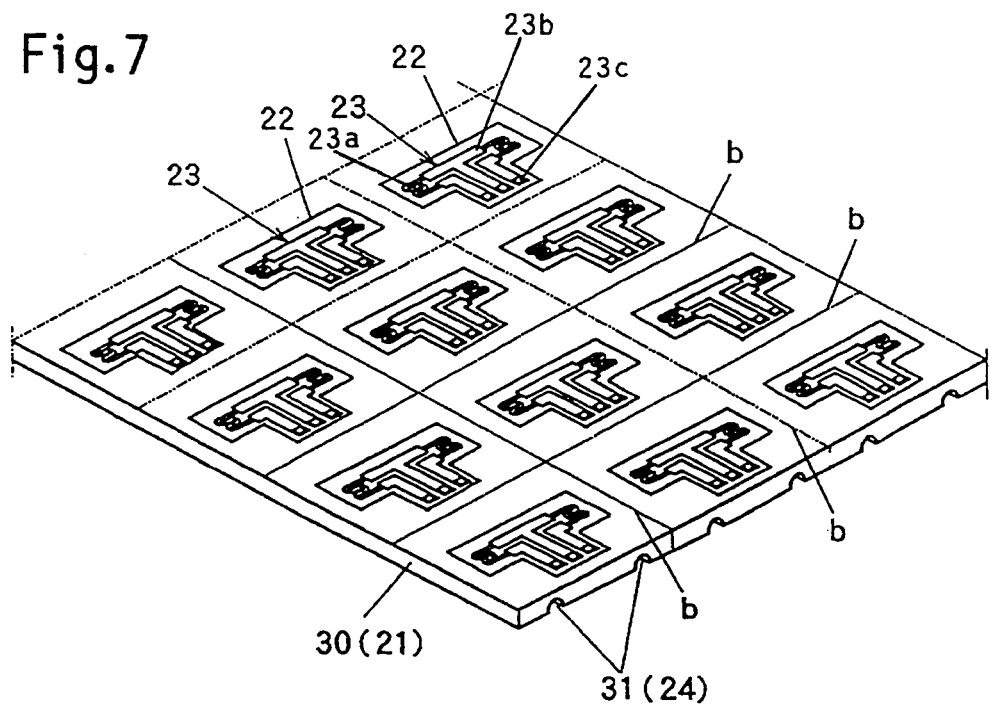
FIG. 7 is a schematic perspective view of the plate material in which a plurality of strain detecting elements are formed.

Subsequent to the formation of the grooves 31 in that surface of the plate material 30, a plurality of strain detecting elements 23 are, as shown in FIG. 7, formed on the surface of the grooved plate material 30 opposite to that surface where the grooves 31 have been formed, in a substantially matrix pattern through electrically insulating layers 22 intervening between each strain detecting element 23 and the opposite surface of the grooved plate material 30.

Figure 8:
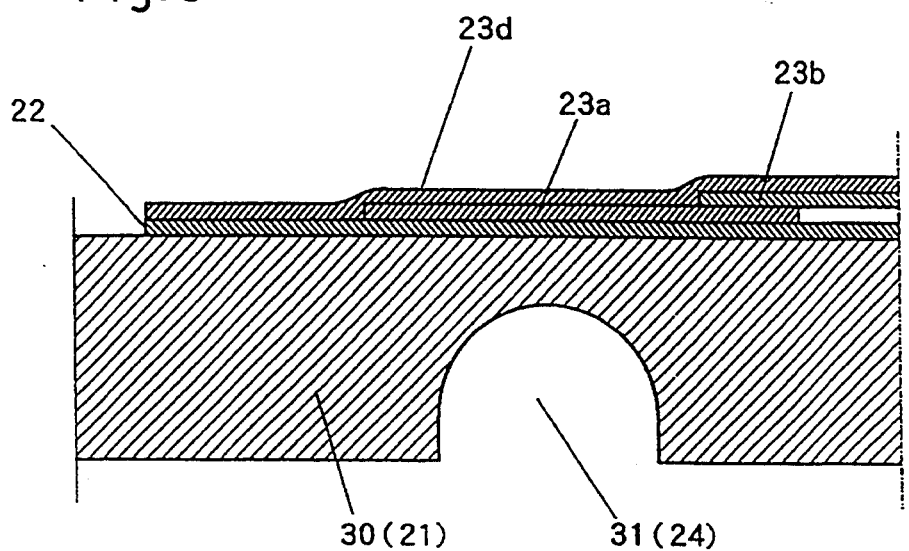
FIG. 8 is a side sectional view, on an enlarged scale, showing the structure of one of the strain detecting elements formed on the plate material.

The formation of the strain detecting elements 23 is carried out by repeating, for example, a sputtering process to form a metallic thin film and an etching process to configure the metallic thin film into a predetermined pattern so that, as schematically shown in FIG. 8, a multilayered structure including at least the strain sensing areas 23a and the conductors 23b are formed. The plate material 30 having the strain detecting elements 23 so formed on that surface thereof are covered by a protective film 23d which may be formed by the use of any known screen printing technique, except for the terminal elements 23c. At this time, each of the strain detecting elements 23 is so positioned that the pair of the strain sensing areas 23a can occupy respective positions in register with the grooves 31 formed on the surface of the plate material 30 opposite to the surface where the strain detecting elements 23 have been formed.

Thereafter, the plate material 30 having the grooves 31 formed on one surface thereof and the plural strain sensing elements 23 formed on the opposite surface (a first surface) thereof is cut along a grid pattern of cutting lines b shown by the phantom line in FIG. 7 to thereby separate the individual strain sensing elements 23 each being of the construction shown in FIG. 2. As a matter of course, the cutting lines b define opposite ends and opposite side edges of each of the strain detecting elements 23 when the latter are separated from each other. Since the cutting lines b merely consist of lines extending widthwise of the plate material 30 and transverse lines extending lengthwise of the plate material 30, the cutting process can extremely easily be performed enough to increase the productivity.

Even where a laser beam is employed in the practice of the cutting process, and since the distances L3 and L4 between the cutting lines b and each strain sensing area 23a are so chosen as to have respective values sufficient to prevent each strain sensing area 23a from being adversely affected by heat brought about the laser beam, the laser beam will not traverse in close proximity to each strain sensing area 23a and, therefore, the highly accurate strain sensors 20 can be obtained at all times.

Figure 9:
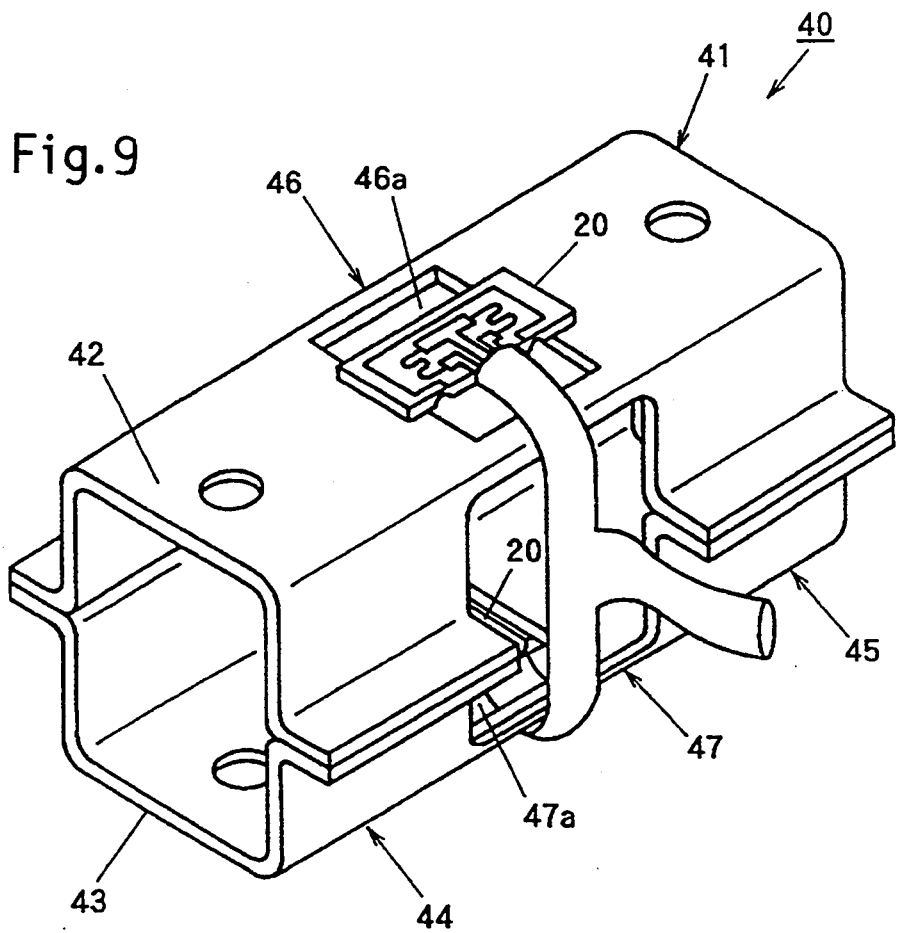
FIG. 9 is a perspective view showing another example of the load cell in which the strain sensor shown in FIG. 1a is employed.

It is to be noted that the strain sensor according to the present invention is utilizable not only in the load cell of the three-beam type as shown in FIG. 1, but also in the load cell of the two-beam type as shown in any one of FIG. 9.

More specifically, the load cell shown in FIG. 9 and now identified by 40 comprises an elastic element 41 of a hollow box-like configuration. This elastic element 41 is of a substantially two-layered structure which includes upper and lower plate members 42 and 43 of a generally U-shaped cross-section, each prepared from a metallic plate and having a pair of side flanges 42a or 43a, said upper and lower plate members 42 and 42 being connected together with the respective pairs of the side flanges 42a and 43a welded together. One end of the elastic element 41, that is, a portion of the elastic element 41 defined by respective one ends of the upper plate member 42 and the lower plate member 43 forms a stationary rigid body 44 while the opposite end of the elastic element 41, that is, an opposite portion of the elastic element 41 defined by respective other ends of the upper plate member 42 and the lower plate member 43 forms a movable rigid body 45, while respective portions of the upper plate member 42 and the lower plate member 43 intermediate between the opposite ends, that is, the stationary and movable rigid bodies 44 and 45 of the elastic element 41 form respective beams 46 and 47. Each of the upper and lower beams 46 and 47 has a generally rectangular opening 46a or 47a defined therein at a location intermediate of the length thereof, and carries a generally rectangular strain sensor 20 mounted in said opening 46a or 47a with its opposite ends fixedly secured to opposite portions of the associated plate member 42 or 43 around the opening 46a or 47a and with its longitudinal axis aligned with the longitudinal axis of the associated plate member 42 or 43.

Thus, it will readily be seen that in the load cell 40 shown in FIG. 9, the two strain sensors 20 each having the two strain sensing areas are employed completing the strain detecting element of a so-called full bridge circuit design.

Figure 11:
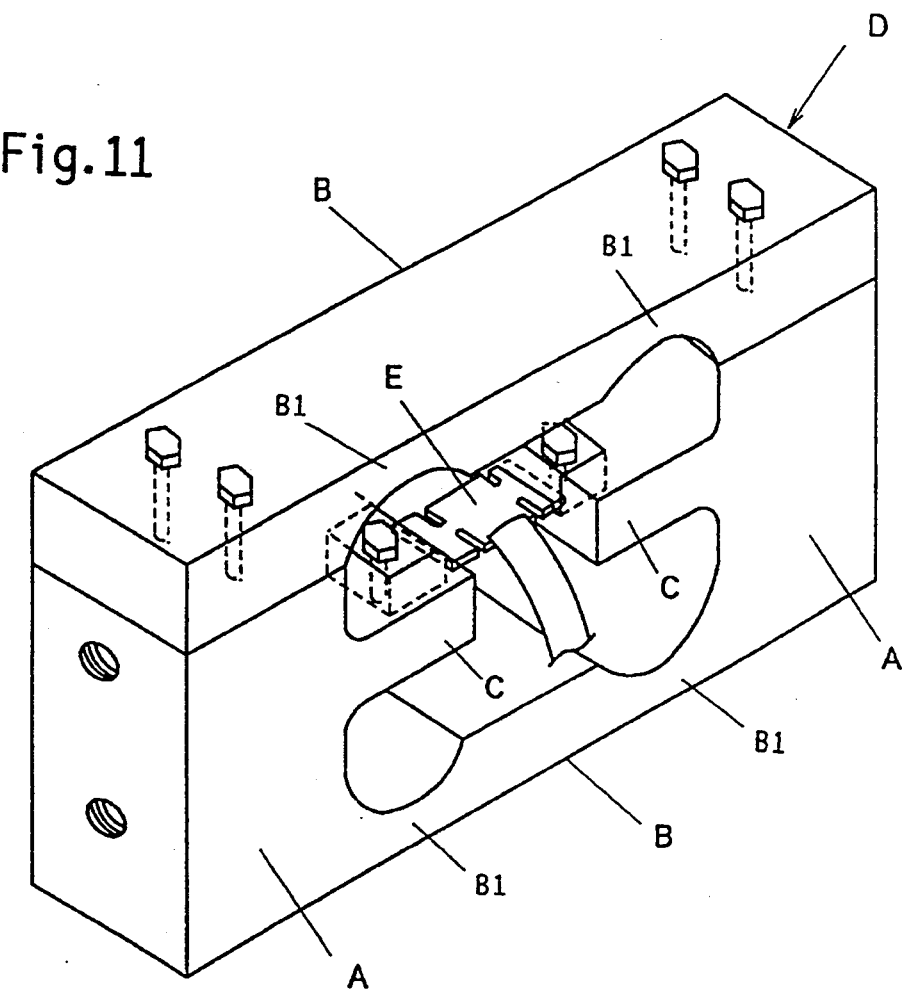
FIG. 11 is a perspective view showing a three-beam type load cell.
Figure 12:
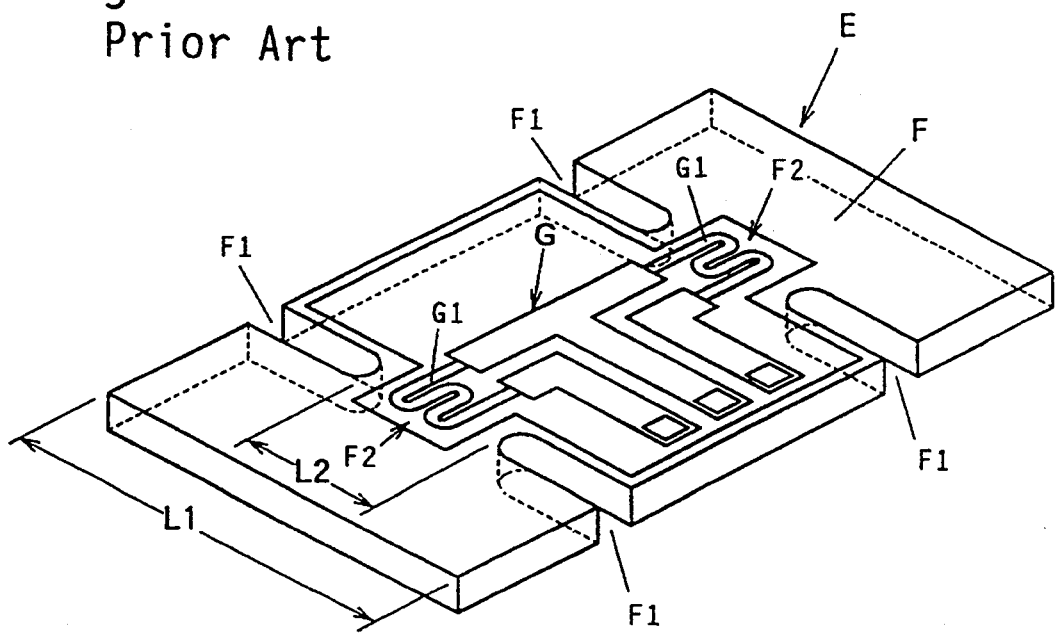
FIG. 12 is a perspective view showing the prior art strain sensor.
Figure 13:
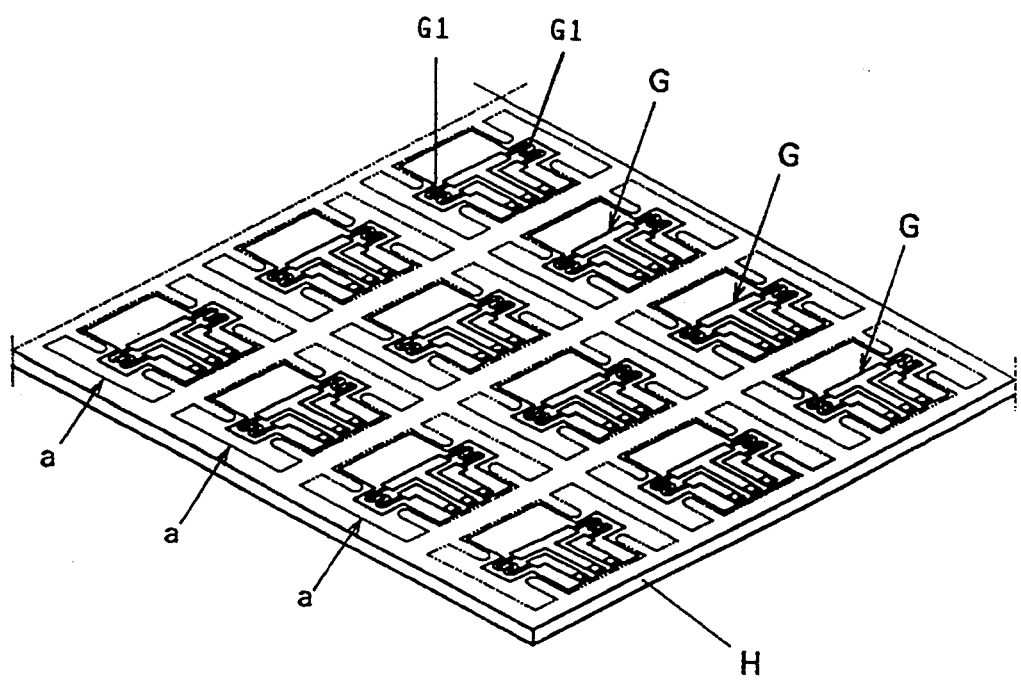
FIG. 13 is a perspective view showing one step of the method of manufacturing the prior art strain sensor.

It is to be noted that, in any one of the foregoing examples of the load cells, each strain sensor 20 or 20A has been shown as a half bridge circuit design in which the two strain sensing areas are employed. However, as shown in FIG. 11, four strain sensing areas for each strain sensor may be formed on a single substrate to provide the strain sensor, now identified by 60, of the full bridge circuit design.

Figure 10:
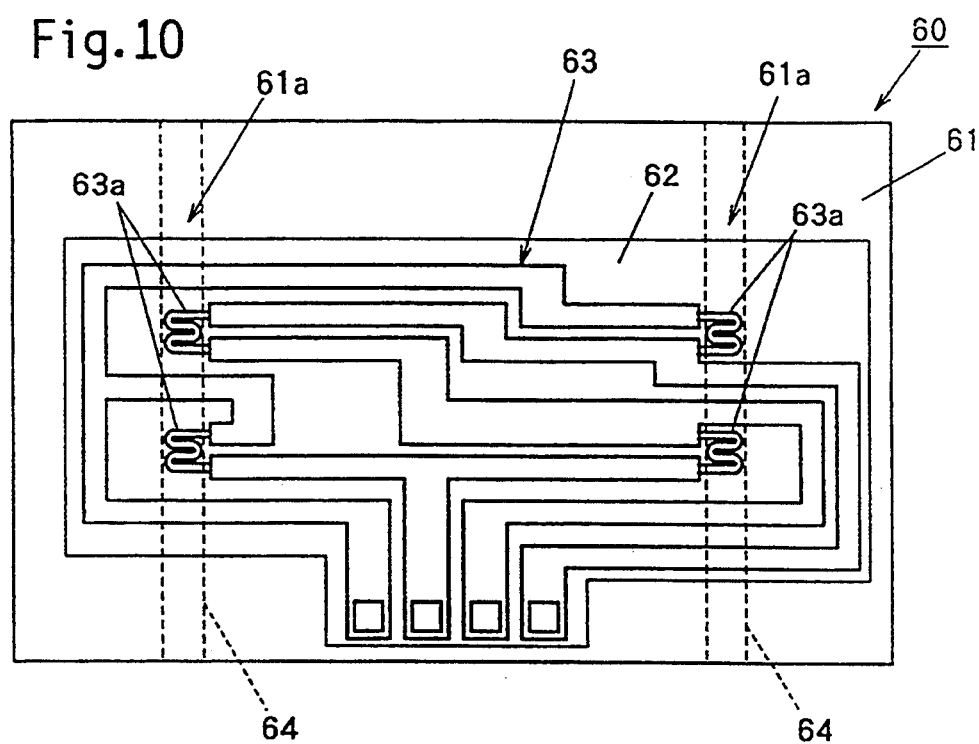
FIG. 10 is a top plan view showing another example of the strain sensor manufactured according to the method of the present invention.

The strain sensor 60 of the full bridge circuit design shown in FIG. 10 is comprised of, as is the case with the strain sensor 20 shown in and described in connection with the foregoing embodiment of the present invention, a generally rectangular substrate 61 having one surface formed with a pair of transverse grooves 64 extending widthwise of the substrate 61 adjacent the opposite ends thereof to define respective areas 61a of low rigidity and also having the opposite surface deposited with a strain detecting element 63 through an electrically insulating layer 62. The strain detecting element 63 so formed on the opposite surface of the substrate 61 has a pair of strain sensing areas 63a defined in register with each transverse groove 64 and, hence, has four strain sensing areas 63a in total number.

In the case of the strain sensor 60 shown in FIG. 10, the two strain sensing areas 63a are arranged in a direction widthwise of the substrate 61 in register with each area 61a of low rigidity. If notches are to be formed in the direction widthwise of the substrate to form an area of low rigidity in the substrate as is the case with the prior art, the substrate must have an increased width. However, according to the present invention, the necessity of use of the substrate having an increased width can be avoided, making it possible to provide a highly precise strain sensor of the full bridge circuit design that is compact in size.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A method of manufacturing individual strain sensors, each of said strain sensors being comprised of a generally rectangular substrate having first and second major surfaces opposite to each other, and a strain detecting element formed on the first major surface of the substrate and having at least one pair of strain sensing areas, said second major surface of the substrate being formed with a pair of grooves extending across the width of the substrate, said strain sensing areas of the strain detecting element being positioned in register with the respective grooves, said method comprising the steps of:

preparing a plate material of a suitable size having first and second surfaces opposite to each other, said plate material eventually forming respective substrates of the individual strain sensors;

forming a plurality of groove segments spaced a predetermined distance from each other on the second surface of the plate material so as to extend parallel to each other;

forming a plurality of strain detecting elements on the first surface of the plate material in a substantially matrix pattern so as to assume a predetermined positional relationship with respective positions of the groove segments; and cutting the plate material along cutting lines extending in two different directions to separate the individual strain sensors.

2. The method as claimed in claim 1, wherein the cutting lines extend perpendicular to each other in respective directions widthwise and lengthwise of the plate material.

3. The method as claimed in claim 1, wherein a distance defined between each cutting line extending in one of the two directions and each of the strain sensing areas of each of the strain detecting elements and a distance defined between each cutting line extending in the other of the two directions and each of the strain sensing areas of such strain detecting element is so chosen as to provide a respective marginal area sufficient to prevent the strain detecting element from being adversely affected during an execution of the cutting step along the cutting lines.

4. The method as claimed in claim 1, further comprising a step of forming terminal elements on the first surface of the plate material at a location between the strain sensing areas of each of the strain detecting elements and adjacent the cutting line corresponding to one side edge of the substrate of each eventually formed strain sensor, said terminal elements being used for electrically connecting the strain detecting element with an external signal processing device.

5. The method as claimed in claim 1, wherein said cutting step is carried out by the use of a laser beam.

6. The method as claimed in claim 1, wherein said groove forming step is carried out by means of an etching process.

7. The method as claimed in claim 1, wherein said plate material is made of metallic material and further comprising a step of forming an electrically insulating layer on the first surface of the plate material prior to the formation of the strain detecting elements.

* * * * *